J. S. HINES.
VEHICLE WHEEL.
APPLICATION FILED MAY 25, 1918.

1,288,890.

Patented Dec. 24, 1918.
2 SHEETS—SHEET 1.

Witness:
Adelaide Kearns.

Inventor:
John S. Hines;
By Robert W. Randle
Attorney.

J. S. HINES.
VEHICLE WHEEL.
APPLICATION FILED MAY 25, 1918.
1,288,890.
Patented Dec. 24, 1918.
2 SHEETS—SHEET 2.
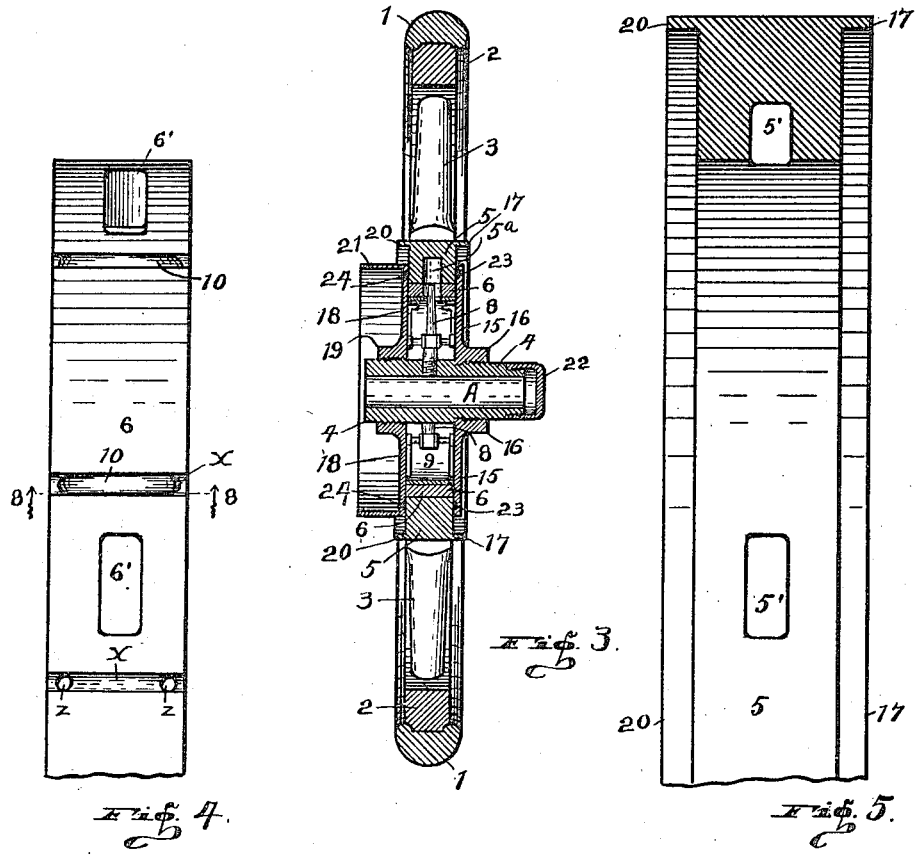
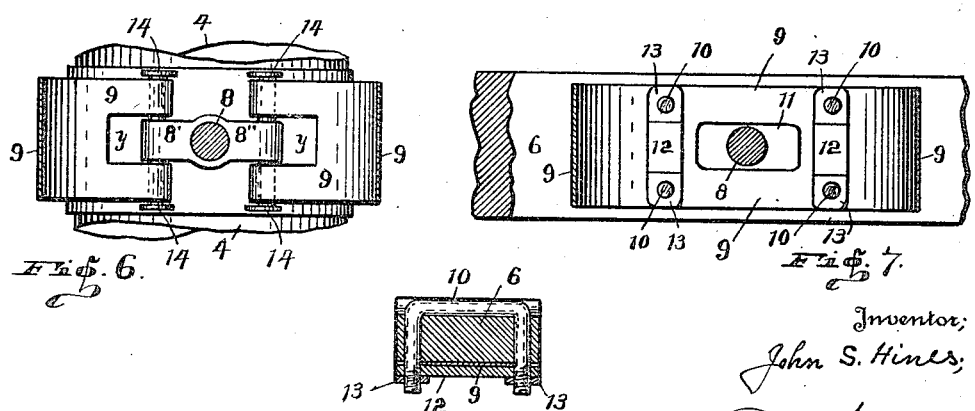
Witness:
Adelaide Kearns.
Inventor:
John S. Hines;
By Robert H. Caudle,
Attorney.

UNITED STATES PATENT OFFICE.

JOHN S. HINES, OF PORTLAND, INDIANA.

VEHICLE-WHEEL.

1,288,890.

Specification of Letters Patent.

Patented Dec. 24, 1918.

Application filed May 25, 1918. Serial No. 236,516.

*To all whom it may concern:*

Be it known that I, JOHN S. HINES, a citizen of the United States, residing in the city of Portland, in the county of Jay, State of Indiana, have invented certain new and useful Improvements in Vehicle-Wheels, of which the following is a comprehensive specification and exposition, such as will enable others to make and construct the same with exactitude.

This invention relates to road-wheels especially adapted for automobiles or other motor vehicles.

The object of this invention is to provide a spring wheel adapted to take the place of the usual pneumatic tired wheels of vehicles, thereby dispensing with the danger of punctures and other accidents which so frequently place pneumatic tired wheels out of commission, at the same time providing a construction which will be comparatively light in weight, which will contribute all of the attributes of a pneumatic-tired wheel, and which can be manufactured and sold at a comparatively low price.

Other particular objects and advantages of this invention will be made apparent in the course of the following explanation, and that which is new will be set forth in the claims concluding this specification.

Figure 1:
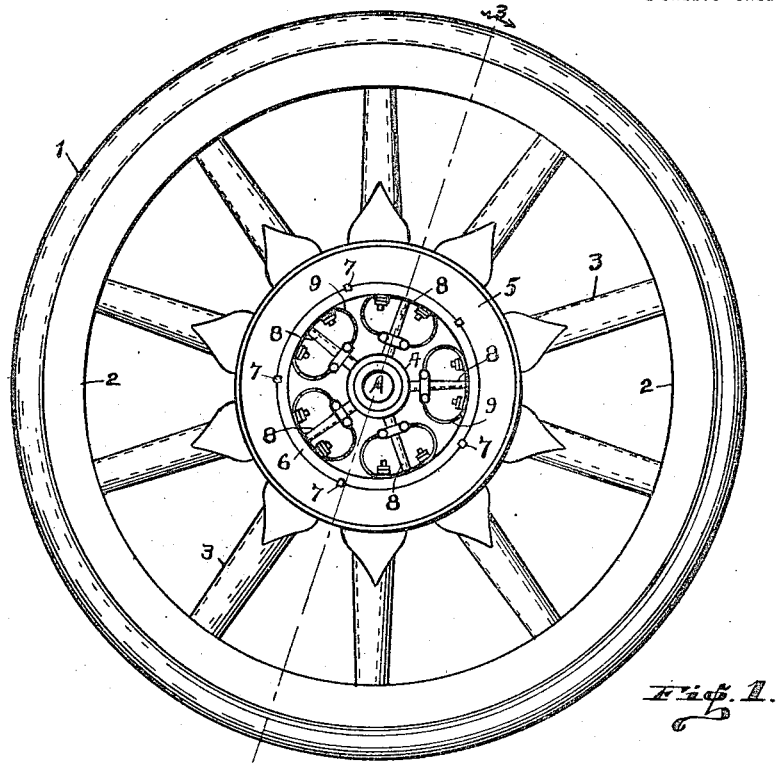

The specific manner of carrying out my invention in a mechanical and a practical manner is shown in the accompanying drawings, in which—Figure 1 is a front elevation of my wheel, with the inclosing disks removed, showing the interior spring mechanism.

Figure 2:
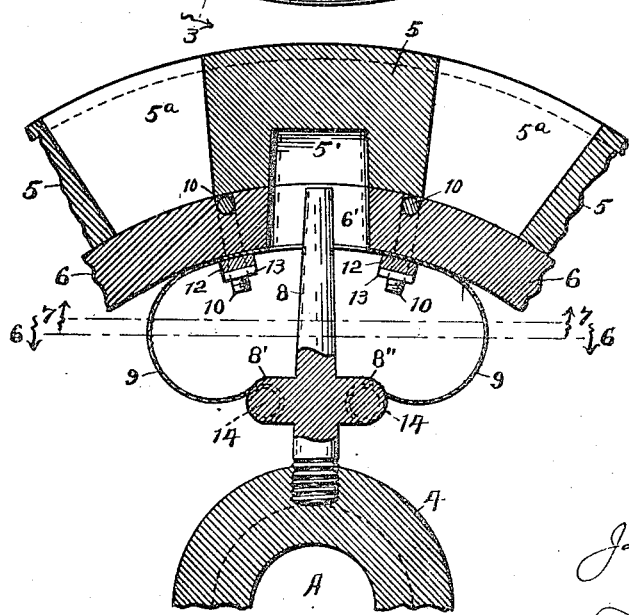

Fig. 2 is a central section of a portion of the wheel, taken at right-angles to the axis thereof.

Fig. 3 is a cross-section of the wheel, taken on the line 3—3 of Fig. 1, but showing the inclosing disks in position therewith. Fig. 4 is a plan view of a portion of the outer periphery of the inner ring of the outer hub member. Fig. 5 is a plan view of a portion of the inner periphery of the outer ring of the outer hub member. Fig. 6 is a detail section as taken in the direction indicated by the arrows on the line 6—6 of Fig. 2. Fig. 7 is a detail section as taken in the direction indicated by the arrows on the line 7—7 of Fig. 2. And Fig. 8 is a cross section of the inner ring of the outer hub member, as taken on the line 8—8 of Fig. 4.

Similar reference characters denote like parts throughout the several views of the two sheets of drawings.

The several views of the drawings clearly show the preferred means for carrying out my invention in a practical manner, and I will describe the same in detail in order to make clear the principles thereof to any one uninformed therewith.

In the drawings numeral 1 denotes an ordinary solid rubber tire which surrounds the rim 2 in the usual manner, and extending inwardly from the rim 2 are a plurality of outer spokes 3.

My invention contemplates two distinct hubs: the inner hub 4, having a central aperture A therethrough to receive an axle, and an outer hub composed of the two rings 5 and 6 which are connected together as hereinafter specified. Formed through the member 5 are a plurality of apertures $5^a$, one for each of the spokes 3, in which are secured the inner ends of the respective spokes 3. Midway between each two of the apertures $5^a$ is a socket 5', which extends outwardly from the inner periphery of the ring 5.

Numeral 6 denotes the inner ring member of the outer hub, the same being adapted to snugly fit the interior of the ring 5, but without threaded connection therewith. The ring 6 is prevented from revolving within the ring 5 by means of one or more keys 7 which are inserted in grooves equally divided between the adjoining edges of said rings 5 and 6.

Apertures 6' are formed through the ring 6, each of which register with one of the apertures 5' when the rings 5 and 6 are in proper relation with each other as in Fig. 1.

Threaded into, or otherwise secured to the hub 4, and radiating therefrom, are a plurality of cruciform spokes 8, the outer end of one of each being located in one of the apertures 6', and adapted to extend into the alining aperture 5'. Integral with and extending out opposite to each other from each spoke 8 are the arms 8' and 8'', the same being located near the periphery of the inner hub 4, as shown in Fig. 2.

Numeral 9 denotes the main springs, the number of which corresponds with the number of spokes 8. Said springs are slightly less in width than is the width of the rings 5 and 6, against the inner periphery of the latter one of which the central portion of said springs are adapted to contact, and where they are rigidly secured on each side of the aperture 6' by two of the U-shaped bolts 10.

The central portion of each bolt 10 fits in a channel x therefor and the prongs, or parallel portions of each bolt fit in the apertures z—z, which are formed through the ring 6. The threaded end portions of each bolt 10 extend through the ring 6 and stride the spring 9, after which they are connected by a cross-bar 12, after which each threaded end of the bolts is provided with a nut 13, thereby the central portion of each spring 9 may be rigidly secured at two points to the ring 6, substantially as shown.

A slot 11 is formed through the center of each spring 9, that is between each two of its secured points above mentioned. Said slots is of like dimensions and registers with its aperture 6', whereby the spoke 8 is disposed through the aperture 11 as shown.

From the above mentioned points of securing, each of the springs 9 extends in reverse curves, with the ends of the spring approaching each other, thereby forming a one-piece elliptical spring as shown. Notches y are formed in each end of each of the springs 9 to receive the ends of the arms 8' and 8''. A headed pin 14 extends through the end portion of each of the arms 8' and 8'' around the projecting portions of which the end portions of the springs are coiled, and where they are pivotedly secured.

Numeral 15 denotes the outer disk, having a central aperture with an outwardly extending flange 16 threaded interiorly whereby it may be run on the threaded outer portion of the hub 4. When turned into place upon said threads the disk 15 will contact with the outer edges or faces of the rings 5 and 6, with the outer edge of said disk approaching but located some distance centerward from the flange 17 which projects outwardly from around the outer edge of the ring 5.

In like manner numeral 18 denotes the inner disk, having a central aperture with a flange 19 therearound which is interiorly threaded whereby it may be run on the threaded portion of the hub 4. When turned into place upon said threads the disk 18 will contact with the edges of the rings 5 and 6, with its outer edge approaching but located some distance centerward from the flange 20 which projects from around the outer edge of the ring 5.

A brake drum 21 projects inward from around the periphery of the disk 18, but this does not pertain to this invention.

Numeral 22 denotes a cap which is threaded on the outer end of the hub 4, thereby closing the end of the aperture A, and covering the end of the axle which may be located in said aperture.

From the above it will be seen that when the disks 15 and 18 are secured in place, as in Fig. 3, they will entirely inclose the spring mechanisms which is shown between the hubs, and in practice the space between the hubs and around said springs may be packed with grease. The grease may be prevented from working out by means of packing, such as felt rings 23 and 24, located in channels formed around in the inner faces of the respective disks 15 and 18, as shown in Fig. 3.

*Modus operandi:* It will now be manifest that the weight of the vehicle and its load will be carried by the axles and transmitted to the wheels, therefore the proportion of the load will be upon the hub 4 where it will be retained in suspension by the springs 9. It will also be noticed that the weight will be equally divided between all of the said springs, some of the springs supporting and others suspending the weight. The weight of course will cause the inner spokes to be driven more or less into the sockets formed in the members 5 and 6 alternately as the wheel revolves.

By this arrangement I attain practically universal movement of the inner hub, that is permitting the periphery of the wheel to travel forward and backward a considerable distance with relation to the inner hub without movement thereof, or vice versa, and also permitting the inner hub to be pressed a considerable distance out of concentric relation with the outer hub.

In practice this particular construction will cause the springs to absorb practically all of the jars incident to travel over a roadway, and also will absorb the sudden jerks incident to starting and stopping the vehicle, all of which will be accomplished without danger or damage, but which would be very deleterious to pneumatic tired wheels, while at the same time I have determined that my wheel will give greater resiliency and ease and comfort to the persons riding in the vehicle than would the usual pneumatic tired wheels.

Should for some reason one or more of the springs of my wheel become broken or inoperative it is evident that the others would carry the weight temporarily, but desiring to repair the same then one has only to lift the weight from the axle, remove the disk 15 by unscrewing the same, after which the hub 4, the ring 6, the inner spokes, and the springs can be slid out and removed as a unit, and then an alternative unit may be slid into the place thereof, all of which can be accomplished in less time than it would take to replace a pneumatic tire. Also this construction will do away with the necessity of carrying extra tires, and one or two of the units just mentioned can be carried in the vehicle.

I desire that it be understood that various changes may be made in the several details of the construction herein described without departing from the spirit of my invention and without secrificing any of the principles thereof.

Having now fully shown and described my invention, what I claim and desire to secure by Letters Patent of the United States, is—

1. A vehicle wheel having an inner hub, cruciform spokes radiating from said hub, an outer hub normally concentric with, spaced from, and surrounding the inner hub, there being elongated sockets formed in the inner periphery of the outer hub to loosely receive the outer end portions of said spokes, a plurality of flat elliptical springs each having a slot in the center thereof to register with one of said sockets and through which the outer end of the respective spokes is disposed, means for securing the central portion of each spring to the inner periphery of the outer hub and on each side of said slot, means for pivotedly connecting the ends of the springs to the cross arms of the respective spokes, disks threaded upon the inner hub and inclosing said springs, the outer portions of said disks being in sliding contact with the edges of the outer hub, and packing disposed between the disks and the faces of the outer hub, all substantially as shown and described.

2. A vehicle wheel comprising an inner hub adapted to receive an axle therethrough, an outer hub, outer spokes radiating from the outer hub, a rim connecting the outer ends of the outer spokes, a plurality of elliptical springs located between said hubs, means for securing the central portion of each spring at two points to the inner periphery of the outer hub, there being a socket between the two securing means of each spring, said socket being formed through the central portion of the spring and extending into the outer hub, inner spokes radiating from the inner hub and each extending into one of said sockets of the outer hub, a pair of arms extending from each side of the inner spokes, means for pivotedly connecting the ends of said springs to said arms, and disks carried by the inner hub and slidably contacting with the sides of the outer hub and inclosing the space between the hubs.

3. A vehicle wheel comprising an inner hub, and an outer hub including an inner ring and an outer ring, means for detachably connecting said rings, outer spokes radiating from the outer ring, sockets formed through the inner ring and extending into the outer ring between each two of the said spokes, inner spokes radiating from the inner hub and projecting loosely into said sockets, a plurality of elliptical springs, corresponding in number to the number of inner spokes, means for securing the central portion of each spring to said inner ring and on each side of said sockets, there being a slot formed through the center of each spring to register with its socket, means for pivotedly connecting the ends of each spring to an inner spoke, and means for inclosing said springs and the space between the inner hub and the outer hub.

4. A vehicle wheel comprising in combination, an inner hub having an axle aperture therethrough, an outer hub comprising an outer ring member and an inner ring member with the latter closely fitting the interior of the outer ring member, means for preventing said ring members from revolving independently of each other, there being apertures formed through the inner ring member which register with respective apertures formed in the outer ring member, spokes secured at their inner ends in the inner hub with their outer ends disposed loosely in their respective apertures of the outer hub, a pair of arms radiating from each of said spokes and located near the inner ring member of the outer hub, elliptical springs corresponding in number with the number of said spokes, U-shaped bolts securing each spring to the inner periphery of the inner ring member, there being a slot formed through the central portion of each spring through which one of said spokes is disposed, means for hinging the ends of said springs to said arms of the respective spokes, and means carried by the inner hub for inclosing the space between the hubs and thereby inclosing said springs, all substantially as shown and described.

JOHN S. HINES.

Witnesses:
 ROBT. W. RANDLE,
 R. E. RANDLE.